Jan. 2, 1968     A. R. CHICK ET AL     3,360,847
METHOD OF ASSEMBLING AND SEALING A MIRROR ASSEMBLY
Original Filed Nov. 16, 1960     2 Sheets-Sheet 1
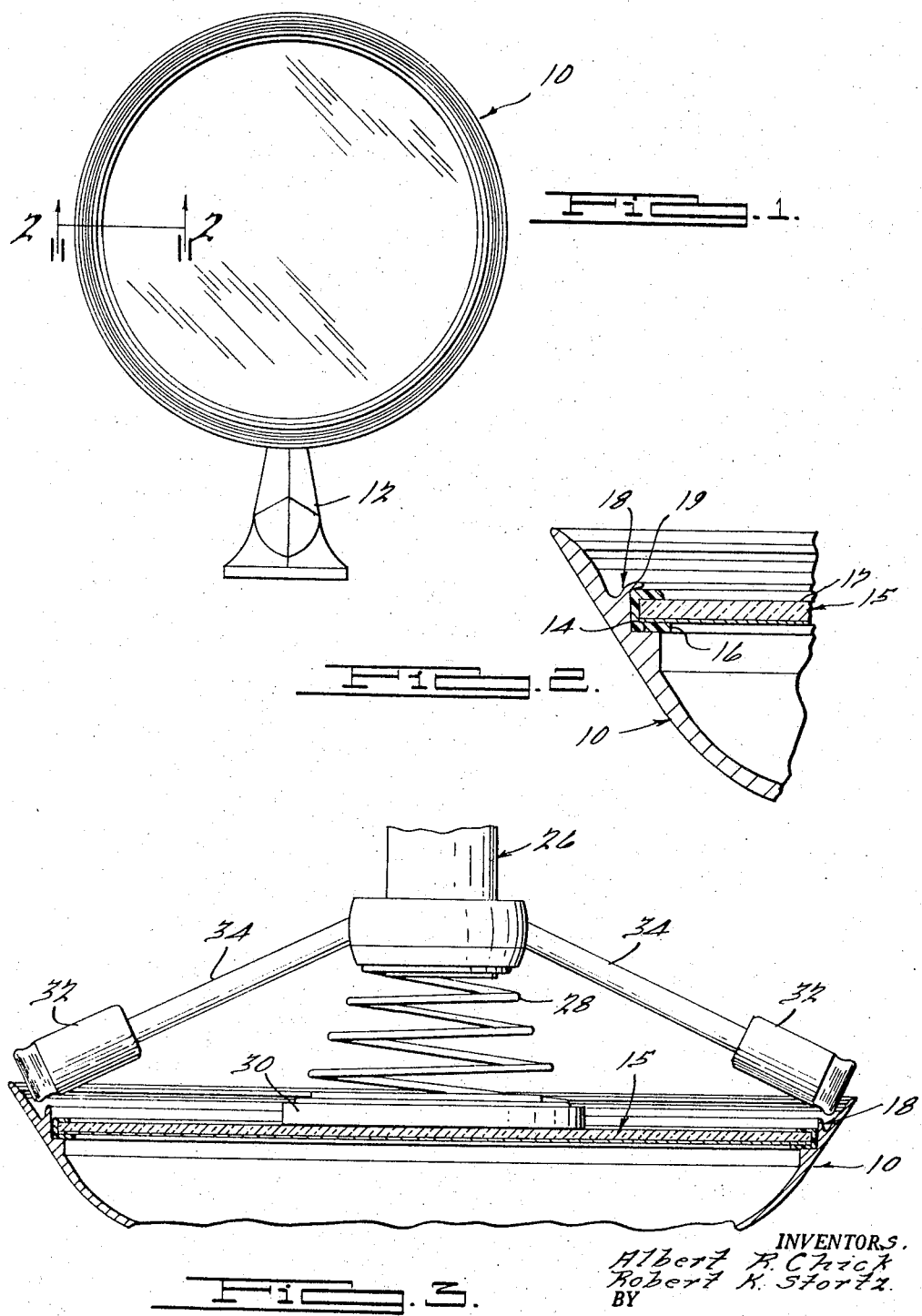

Jan. 2, 1968  A. R. CHICK ET AL  3,360,847
METHOD OF ASSEMBLING AND SEALING A MIRROR ASSEMBLY
Original Filed Nov. 16, 1960  2 Sheets-Sheet 2

INVENTORS.
Albert R. Chick.
Robert K. Stortz.
BY
Harness, Dickey & Pierce
ATTORNEYS.

United States Patent Office 3,360,847
Patented Jan. 2, 1968

3,360,847
METHOD OF ASSEMBLING AND SEALING A MIRROR ASSEMBLY
Albert R. Chick, New York, N.Y., and Robert K. Stortz, Brookfield, Wis., assignors to C. M. Hall Lamp Company, Detroit, Mich., a corporation of Michigan
Continuation of application Ser. No. 69,616, Nov. 16, 1960. This application July 24, 1964, Ser. No. 385,027
1 Claim. (Cl. 29—451)

ABSTRACT OF THE DISCLOSURE

There is herein disclosed an outside-type vehicular mirror assembly comprising a housing providing a mirror opening and a surrounding mirror seat supporting a mirror and mirror gasket and held in place by an inwardly turned lip. There is also disclosed an assembly method wherein the mirror and gasket are mounted on the seat and the lip is subsequently turned inwardly, and an assembly method wherein the lip is turned inwardly and then the mirror and gasket are forced over the lip onto the seat.

---

This invention relates to the method of securing mirrors in cast or molded holders and is a continuation application of copending application S.N. 69,616, filed Nov. 16, 1960, now abandoned.

The majority of commercial automotive outside rear view mirrors have included a drawn metal head which is flanged over the exposed face of the mirror glass to retain the mirror in position. With the advent of molded and die cast mirror heads, other means for securing the mirror glass to the head have been employed. In the common practice, the rear surface, or a portion thereof, is cemented to a backing flange or plate formed in or secured within the head. It has proved difficult to establish bonds which will adequately secure the mirror to the head against the effects of vibration and ambient conditions.

It is an object of this invention to improve the method of securing a mirror member in a cast or molded head or housing.

The manner of accomplishing the foregoing object and other objects, features, and advantages of the present invention will become apparent from the subsequent description, taken in conjunction with the accompanying drawings, in which:

FIGURE 1 is an elevational view of a mirror embodying certain of the features of this invention;

FIGURE 2 is a fragmentary sectional view taken along the line 2—2 in FIGURE 1;

FIGURE 3 is a fragmentary sectional side elevational view of a mirror assembly and rolling means, illustrating one method of manufacturing the mirror;

Figure 4:
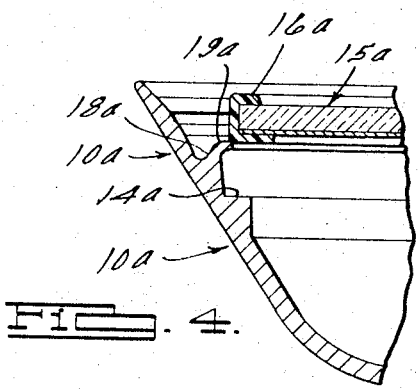
FIGURE 4 is a fragmentary sectional view of a construction similar to that shown in FIGURE 2, during a stage of its manufacture.

While various shaped housings, comprising a peripheral wall radially defining a volume and an opening at one end, could be used, a generally conically-shaped mirror head or housing 10 is illustrated in FIGURE 1 by way of example and is shown mounted in a conventional manner on a base 12. The mirror housing 10 (FIGURE 2) has a radially inwardly extending annular shoulder or backing surface 14 for receiving an assembly comprising a rear surface mirror member 15 with an annular channel gasket or sealing member 16 enveloping its peripheral edge. The gasket 16 and mirror member 15, with its reflecting side 17 facing axially outward, are secured to the shoulder 14 of the housing 10 by the overlapping engagement of a folded retaining portion 19 of an annular lip 18 which is integral with the housing 10.

The mirror housing 10 is die cast from a reasonably ductile metal which facilitates cold forming or rolling, such as Zamac, which has a composition of approximately 80% zinc and 20% aluminum. The gasket 16 has a generally U-shaped or channel cross-section and is of a semi-rigid plastic such as polyethylene or the like.

In one method of manufacturing a mirror having a construction as shown in FIGURE 2, the first step is placing an assembly comprising the mirror member 15 and the channel gasket 16 upon the shoulder 14 within the mirror housing 10. Next, rolling means, exemplified by the rolling apparatus 26 in FIGURE 3, is positioned along the axis of the mirror housing 10 and in contact wtih the central portion of the mirror member 15 by means of a spring 28 and a flat plate 30. As the rolling apparatus 26 is moved axially towards the mirror housing 10, the force created by the spring 28 and transmitted by the plate 30 forces the mirror member 15 to seat positively against the shoulder 14. Further axial movement of the rolling apparatus 26 brings rollers 32, which are rotatably secured to the rolling apparatus 26 by shafts 34, into contact with the annular lip 18. The rolling apparatus 26 is then simultaneously rotated and moved axially towards the mirror member 15 until a folded retaining portion 19 is formed on the axially outwardly extending annular lip 18 and is rolled inwardly into contact with the channel gasket 16. The lip 18 yields readily since it is made of a relatively ductile alloy material, i.e., zinc and aluminum. Upon completion of the rolling, the planar area defined by the periphery of the folded retaining portion 19 is less than that defined by mirror member 15; thereby locking the mirror member 15 to the housing 10. The rollers 32 could be provided with knurled surfaces so as to produce a decorative design on the folded retaining portion 19 during the rolling operation.

The annular lip 18 has a generally decreasing thickness from its juncture with the housing 10 to the extremity of the folded retaining portion 19 in order to provide incremental bending in the formation of the folded retaining portion 19 and to avoid abrupt bending of the lip 18 at the peripheral edge of the mirror member 15. The importance of this feature is that by insuring that the lip will fold at a point removed from the edge of the mirror member the possibility of damage to the mirror member during the rolling operation is obviated. In the method as described above, the mirror housing 10 is plated to provide a lustrous finish before the assembly and rolling operation.

Figure 5:
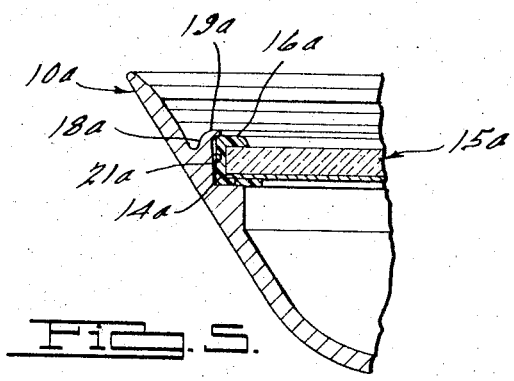
FIGURE 5 is a fragmentary sectional view of the embodiment of FIGURE 4, upon completion.

In another method of sealing a mirror having a construction similar to that shown in FIGURE 2, the first step is rolling the annular lip 18a (FIGURE 4) to form a radially inwardly extending folded retaining portion 19a on an unplated mirror housing 10a. Subsequently, the mirror housing 10a is plated. By plating after rolling the problems of marring, crazing, etc. associated with rolling a plated surfacce are obviated. Next, an assembly comprising a mirror member 15a and a channel gasket 16a is positioned in peripheral contact upon the folded retaining portion 19a. As shown in FIGURE 4, it may be observed that the mirror member and gasket are supported in parallel planar relationship with the opening and the shoulder. At this point the planar area defined by the periphery of the folded retaining portion 19a is less than that defined by the periphery of the channel gasket 16 but is greater than the planar area defined by the periphery of the mirror 15a. Next, an axial force is used to press-fit the assembly past the folded retaining portion 19a against the shoulder 14a of the housing 10a (FIGURE 5). It may be observed by reference to FIGURES 4 and 5 that the gasket and mirror member will be moved by the axial force in a plane parallel to the opening until the gasket is fully seated in contactc with the wall between the lip and the shoulder in restraining engagement with the mirror to hold the mirror in the housing. In order to facilitate assembly the radial dimension of the assembly comprising the mirror member 15a and the channel gasket 16a is less than that of wall 21a (FIGURE 6) on the mirror housing 10a; thus, upon assembly a slight radial gap results.

In the constructions described above, the mirror member is securely retained within the mirror housing and cannot fall out.

The gasket serves a dual function. First, it seals the internal portions of the mirror housing from the elements, salt, etc., thereby preventing corrosion. In the case where a rear surface mirror is utilized, the seal also protects the reflective coating applied to the rear surface of the mirror from attack by the elements, salt, etc. The second function of the seal is to help absorb shocks and minimize the vibration of the mirror member within the housing, thus protecting the mirror from damage.

Figure 6:
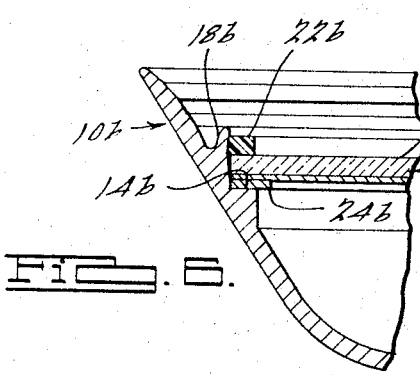
FIGURE 6 is a fragmentary sectional view of a modification of the construction shown in FIGURE 2 during a stage of its manufacture.
Figure 7:
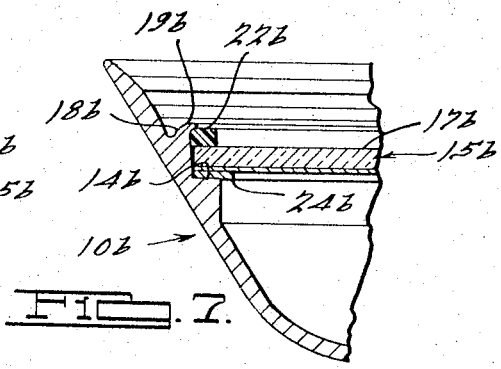
FIGURE 7 is a fragmentary sectional view of the embodiment of FIGURE 6 as completed.

In a method of sealing a mirror having a construction as shown in FIGURES 6 and 7, the first step consists of placing an annular resilient ring 24b of cork or the like on a shoulder 14b of a plated die cast mirror housing 10b. Next a mirror member 15b is placed upon the resilient ring 24b. An annular gasket 22b, having a generally rectangular cross-section and being of a rigid plastic such as vinyl or the like is located peripherally upon the reflecting side 17b of the mirror member 15b (FIGURE 6). Next, an annular lip 18b is rolled by means exemplified by the rolling apparatus 26 shown in FIGURE 3 to form a radially inwardly folded retaining portion 19b which overlaps the mirror member 15b and gasket 22b. As assembled, the planar area defined by the periphery of the folded retaining portion 19b is less than that defined by the mirror member 15b and also less than that defined by the outer periphery of the gasket 22b.

Figure 8:
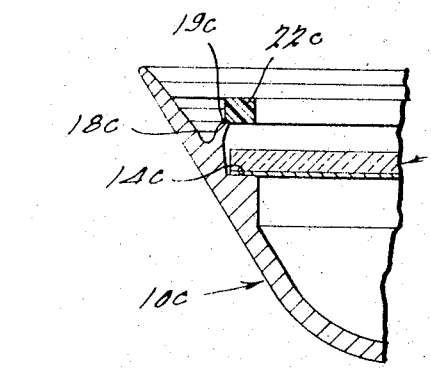
FIGURE 8 is a fragmentary sectional view of an embodiment similar to that shown in FIGURE 7, during a stage of its manufacture.

Another method of assembling a mirror having a construction similar to that shown in FIGURE 7 has a first step of rolling a lip 18c (FIGURES 8 and 9) of an unplated mirror housign 10c to form a radially inwardly extending retaining portion 19c. After the housing 10c is plated, a mirror member 15c is located upon an annular shoulder 14c of the mirror housing 10c. Note that the mirror member 15c has a planar area less than the defined by the periphery of the folded retaining portion 19c. Next, a gasket 22c having a rectangular cross-section is positioned in peripheral contact upon the folded retaining portion 19c (FIGURE 8). At this point the planar area defined by the periphery of the folded retaining portion 19c is less than that defined by the outer periphery of the gasket 22c. Next, an axial force is applied to the annular gasket 22c and it is press-fitted past the folded retaining portion 19c into engagement with the mirror member 15c, resulting in the construction shown in FIGURE 9. In order to facilitate assembly of the construction as shown in FIGURE 9 and described above, a slight radial gap exists between wall 21c of mirror housing 10c and the mirror member 15c and gasket 22c.

Figure 9:
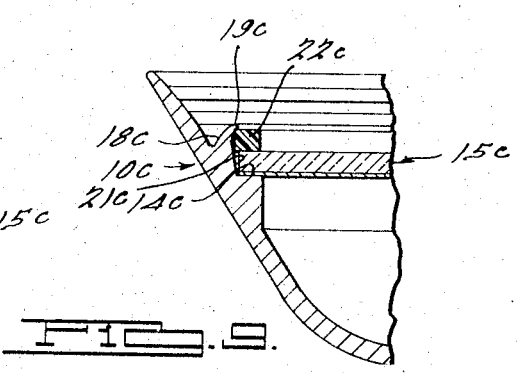
FIGURE 9 is a fragmentary sectional view of the embodiment of FIGURE 7, upon completion.

The prior discussion as to the dual function of the gasket and as to the tapering of the lip with regard to the construction and method of sealing as shown in FIGURES 2, 4 and 5 is equally applicable to the construction shown in FIGURES 7 and 9.

While a rear surface type mirror is shown in the drawings and is discussed with regard to the various constructions, it should be understood that the methods of sealing the mirror as shown above are equally applicable to a mirror having the reflective coating on its front side.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A method of sealing a mirror assembly comprising a cast metallic unplated mirror housing having a peripheral wall radially defining a volume and an opening at one end, the wall having an internally disposed peripheral shoulder located axially inwardly from the one end and extending radially inwardly, an axially outwardly extending lip integral with the wall being peripherally internally disposed between the one end and the shoulder, said method comprising the steps of placing a sealing member having a generally U-shaped cross-section in enveloping relationship about the peripheral edge of a mirror member outside of said mirror housing, rolling the axially outwardly extending lip to form a radially inwardly extending folded portion defining a planar area larger than that defined by the mirror member and smaller than that defined by the sealing member, plating the mirror housing, and the positioning the mirror member and the sealing member upon the folded portion, and press-fitting the sealing member and simultaneously moving the mirror member past the folded portion to bring the sealing member into contact with the shoulder of the wall and the wall between the shoulder and the lip to hold the mirror member within the housing.

References Cited
UNITED STATES PATENTS

| | | | |
|---|---|---|---|
| 1,811,823 | 7/1931 | Horton | 88—96 |
| 2,056,024 | 9/1936 | Stuart. | |
| 2,331,449 | 10/1943 | Wittenberg | 29—511 X |
| 2,426,714 | 9/1947 | Sonnenberg et al. | 29—511 X |
| 2,579,148 | 12/1951 | Jones | 88—96 |

CHARLIE T. MOON, *Primary Examiner.*